Figure 1A:
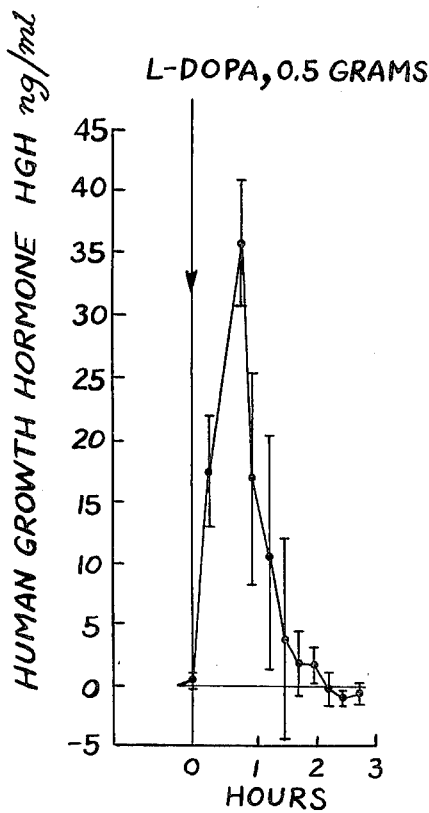

United States Patent [19]
Guillemin et al.

[11] 3,904,594
[45] Sept. 9, 1975

[54] SOMATOSTATIN AND ACYLATED Des-(Ala¹, Gly²) DERIVATIVES THEREOF

[75] Inventors: Roger C. L. Guillemin, La Jolla; Paul E. Brazeau, Jr., Solana Beach; Roger C. Burgus, Leucadia; Nicholas C. Ling, San Diego; Jean E. F. Rivier; Wylie W. Vale, Jr., both of La Jolla, all of Calif.

[73] Assignee: The Salk Institute for Biological Studies, San Diego, Calif.

[22] Filed: June 12, 1974

[21] Appl. No.: 478,175

Related U.S. Application Data

[63] Continuation-in-part of Ser. No. 375,334, June 2, 1973, abandoned.

[52] U.S. Cl.............................. 260/112.5; 424/177
[51] Int. Cl.². ................ C07C 103/52; A61K 37/00
[58] Field of Search.................. 260/112.5; 424/177

[56] References Cited
OTHER PUBLICATIONS

Brazeau et al., Science, 179, 77–79 (1973).
Vale et al., C. R. Acad. Sci., Ser. D, 275, 2913–2916 (1972).
Burgus et al., Proc. Nat. Acad. Sci., U.S.A., 70, 684–688 (1973).
Rivier et al., C. R. Acad. Sci., Ser. D, 276, 2737–2740 (1973).

*Primary Examiner*—Lewis Gotts
*Assistant Examiner*—Reginald J. Suyat
*Attorney, Agent, or Firm*—Fitch, Even, Tabin & Luedeka

[57] ABSTRACT

Various peptides have been prepared which inhibit the secretion of growth hormone in mammalians, including humans. The peptides are useful in the treatment of acromegaly and diabetes and are also useful in controlling the release of thyroid stimulating hormone.

20 Claims, 4 Drawing Figures

SOMATOSTATIN AND ACYLATED DES-(ALA¹, GLY²) DERIVATIVES THEREOF

The present application is a continuation-in-part of U.S. Pat. application Ser. No. 375,334 filed July 2, 1973, now abandoned.

The present invention relates generally to novel peptide compositions having inhibitory influence on the growth promoting function of the pituitary gland in humans and animals. More particularly, the present invention is directed to novel peptide compositions which influence the release of growth hormone by the pituitary gland.

The pituitary gland is attached by a stalk to the region in the base of the brain known as the hypothalamus. The pituitary gland has two lobes, the anterior and posterior lobes. The posterior lobe of the pituitary gland stores and passes into the general circulation two hormones manufactured in the hypothalamus, these being vasopressin and oxytocin. The anterior lobe of the pituitary gland secretes a number of hormones, which are complex protein or glycoprotein molecules that travel through the blood stream to various organs and which, in turn, stimulate the secretion into the blood stream of other hormones from the peripheral organs. The pituitary gland secretes an adenocorticotropic hormone which stimulates the cortex of the adrenal gland to secrete corticosteroids. A thyroid stimulating hormone, also known as thyrotropin, is released which stimulates secretions by the thyroid gland. Follicle stimulating hormone, luteinizing hormone and prolactin are also released by the pituitary gland. These latter hormones in various combinations regulate lactation and functioning of the gonads to produce testosterone in the testes and progesterone and estrogen in the ovaries, as well as regulating the production and maturation of gametes.

The anterior pituitary also produces a growth hormone which directly affects statural growth in mammalians, including humans. The growth hormone released by the pituitary gland is also referred to as somatotropin. It has been reported (L. Krulich et al., *Endocrinology*, Vol. 85, p. 319, 1969) that a crude extract of hypothalamus origin would function to inhibit the secretion of growth harmone. However, an active material capable of reliably effecting such inhibition has not previously been characterized. The present invention relates to the preparation of therapeutically valuable peptides which are effective when introduced either directly or indirectly into the blood stream to inhibit the secretion of growth harmone from the pituitary gland of humans and animals. The peptides may be introduced indirectly into the blood stream by injecting the peptides subcutaneously, intramuscularly or by any other known method either with or without a carrier. For ease of discussion herein, a material exhibiting inhibitory effect on the secretion of growth hormone (somatotropin) is referred to as "somatostatin." The particular peptides of the present invention which have been found effective to inhibit the secretion of growth hormone are sometimes referred to herein as somatostatin peptides.

The principal object of the present invention is to provide peptide materials which have an inhibitory effect on the secretion of growth hormone by the pituitary gland of mammalians, including humans.

This and other objects of the present invention will become more apparent from the following detailed description.

Figure 1B:
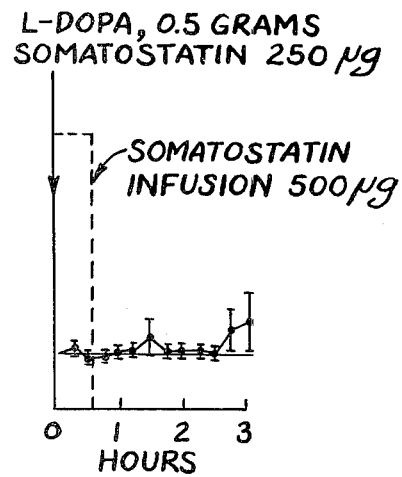
Figure 2A:
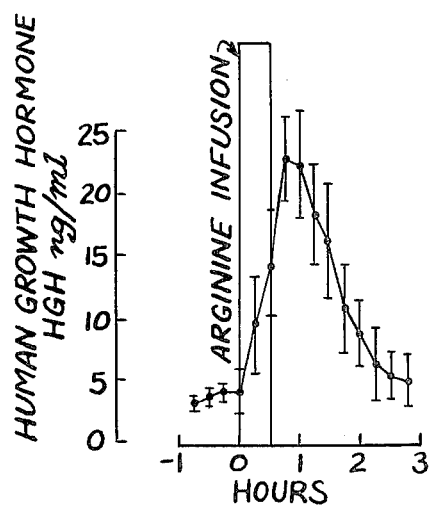
Figure 2B:
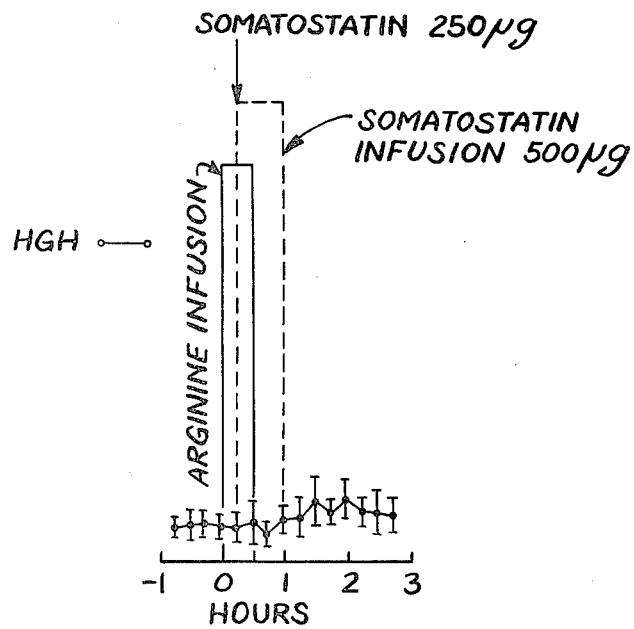

FIGS. 1a and 2a show the rate of human growth hormone secretion in the human subject after administration of the growth hormone stimulants L-DOPA and arginine, respectively. FIGS. 1b and 2b show the rate of human growth hormone secretion in the subject after administration of growth hormone stimulants and somatostatin.

Generally, in accordance with the present invention, a peptide has been isolated from ovine hypothalamus fragments which inhibits secretion in vitro of immunoreactive growth hormone by rat pituitary cells and is also active in vivo in mammalians, including humans. The starting material from which the peptide was derived was hypothalamic fragments from about 500,000 sheep brains. The hypothalamic fragments were subjected to extraction in a system consisting of 810 volume parts of ethanol — 100 volume parts of chloroform — 5 volume parts of glacial acetic acid and 90 volume parts of water. All parts, percentages and ratios used herein are by volume unless specifically expressed otherwise. The extract was partitioned in a system containing 0.1 percent acetic acid in water: n-butanol: pryidine, in a volume ratio of 11:5:3. The material obtained from the organic phase was then again partitioned in n-butanol: glacial acetic acid: water, in a volume ratio of 4:1:5. The aqueous phase from the second extraction was subjected to ion-exchange chromotography on carboxymethyl cellulose. This provided a fraction with somatostatin activity. This fraction was further purified by gel filtration on "Sephadex G-25" gel in 0.5 molar acetic acid. Further purification was effected by liquid partition chromatography on a "Sephadex G-25" support in a system comprising n-butanol: glacial acetic acid: water, at a volume ratio of 4:1:5. The final purified product weighed 8.5 milligrams and contained 77 percent amino acids by weight and showed only traces of peptide impurities upon being subjected to thin layer chromatography and electrophoresis.

Quantitative amino acid analysis of the peptide isolated by the above procedure gave the following molar ratios: Ala, 1; Gly, 1; Thr, 2; Lys, 2; Phe, 3; Ser, 1; Cys, 2; Trp, 1; Asp, 1; NH₃,1. Amino acid analysis, after total enzymatic digestion with papain and leucine aminopeptidase, showed the same amino acid ratios except that Asp occurred as Asn.

The structure of the peptide was determined by stepwise Edman degradation performed on the intact carboxymethylated peptide, as well as on the unresolved products of tryptic and chymotryptic digests of the peptide. The products of Edman degradation were evaluated by the subtractive method by means of amino acid analysis, determination of the successive amino terminals with dansyl chloride and mass spectrometry of 3-phenyl-2-thiohydantoin derivatives. The structure of the peptide isolated from the hypothalamic fragments of sheep brains was found to be bridged and was identified as follows:

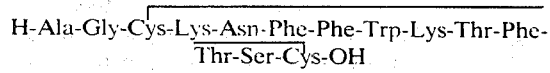
H-Ala-Gly-Cys-Lys-Asn-Phe-Phe-Trp-Lys-Thr-Phe-Thr-Ser-Cys-OH

The abbreviations above are conventional and are based on the trivial name of the amino acids comprising the peptide; where Ala is alanine, Gly is glycine, Cys is cysteine, Lys is lysine, Asn is asparagine, Phe is phenylalanine, Trp is tryptophan, Tyr is tyrosine, Thr is threonine and Ser is serine. The formula as represented above is in accordance with conventional representation of peptides where the amino group appears to the left and the carboxyl group to the right. Isomers of the amino acids, where possible, are intended to be included by the trivial name, unless otherwise specifically indicated.

Generally, other bridged peptides having the following structure are also biologically active to inhibit secretion of growth hormone in vitro and in vivo in mammalians, including humans:

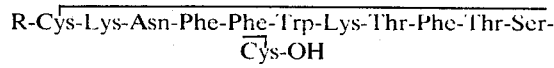

R is an acylating agent or hydrogen. It has been discovered that Tyrosine (Tyr) may be substituted for any Phe. It is also likely that any of the amino acid moieties in the somatostatin peptide can be substituted by other amino acids.

More surprisingly, linear peptides, synthesized by solid-phase techniques and purified by gel filtration in the presence of 2-mercaptoethanol, had the same biological activity in respect to inhibition of growth hormone secretion as the bridged peptides described above. The linear peptides found to be effective have the structure:

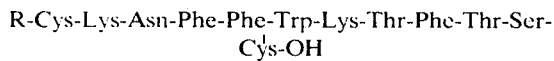

where R is as described above in connection with the bridged peptides. The same amino acid substitutions may be made in the linear peptides as were described in connection with the bridged peptides.

As used herein the term "acylating agent" refers to an organic compound which is capable of providing an acyl group, which is

Preferred acylating agents which have been found to be functional in the peptides of the invention are selected from the following: (a) Any amino acid. For the bridged peptides, it is preferred that the amino acid does not contain a sulfhydryl group; (b) A dipeptide produced from any two amino acids wherein the second amino acid connected to Cys does not contribute steric hindrance. Preferred second amino acids are Gly, Ala and β-Ala. For the bridged peptides, it is preferred that the amino acids of the dipeptide do not contain a sulfhydryl group; (c) A tripeptide wherein the third amino acid connected to Cys does not contribute steric hindrance and wherein the remaining two amino acids are any amino acid. Preferred third amino acids for the tripeptide are Gly, Ala and β-Ala. For the bridged peptides it is preferred that none of the amino acids of the tripeptide contain a sulfhydryl group; (d) Aliphatic, aromatic, and cyclic organic acids, other than amino acids, having from 1 to 10 carbon atoms. The organic acids can be saturated and/or can contain other functional groups. Particularly preferred acylating agents are selected from organic compounds which provide the following acyl groups: Gly, Ala, Ala-Gly, Acetyl-Ala-Gly, Tyr-Gly, Sarc-Gly, Tyr-Ala-Gly, Ala-Tyr-Gly, Acetyl, Acryl, Pivalyl, and Benzoyl.

Each of the amino acids in that portion of the somatostatin peptides of the present invention extending between and including the two Cys groups, are the L-isomer composed the amino acid has isomeric forms. Any amino acid which comprises the R group of the peptides of the present invention may be either the L-isomer or the D-isomer where the amino acid has isomeric forms.

The somatostatin peptides of the present invention were synthesized by solid phase techniques. The synthesis was conducted in a stepwise manner on chloromethylated resin. The resin was conposed of fine beads (20–70 microns in diameter) of a synthetic resin prepared by copolymerization of styrene with 1 to 2 percent divinylbenzene. The benzene rings in the resin were chloromethylated in a Friedel-Crafts reaction with chloromethyl methyl ether and stannic chloride. The chlorine thus introduced is a reactive benzyl chloride type of linkage. The Friedel-Crafts reaction is continued until the resin contains 0.5 to 2 millimoles of chlorine per gram of resin. Herein below, in the further description of the synthesis of somatostatin peptides, the reagents used will be first listed by their chemical name and their common abbreviation in parenthesis. Thereafter, the reagent will be referred to by the common abbreviation.

The triethyl ammonium salt of protected Cys was esterified onto the chloromethylated resin by refluxing in ethanol for about 48 hours. The amino group of Cys was protected with t-butyloxycarbonyl (Boc). The S-side chain of Cys was protected with p-methoxybenzyl (MeOBzl). Benzyl (Bzl) can also be used as an S-protecting group.

After deprotection and neutralization, the $N^{\alpha}$-Boc derivative of the next amino acid, Ser, was added along with a coupling agent, which was dicylohexylcarbodiimide (DCC). The side chain of Ser was protected with benzyl ether (OBzl). Deprotection, neutralization and addition of successive amino acids was performed in accordance with the following schedule: Schedule for coupling of amino acids other than Asn in solid phase synthesis of Somatostatin

| Step | Reagents and operations | Mix times min. |
|---|---|---|
| 1 | $CH_2Cl_2$ wash 80 ml (2 times) | 3 |
| 2 | Methanol (McOH) wash 30 ml (2 times) | 3 |
| 3 | $CH_2Cl_2$ wash 80 ml (3 times) | 3 |
| 4 | 50 percent trifluoroacetic acid (TFA) plus 5 percent 1,2-ethanedithiol in $CH_2Cl_2$ 70 ml (2 times) | 10 |
| 5 | $CH_2Cl_2$ wash 80 ml (2 times) | 3 |
| 6 | Triethylamine ($Et_3N$) 12.5 percent in dimethylformamide (DMF) 70 ml (2 times) | 5 |
| 7 | McOH wash 40 ml (2 times) | 2 |
| 8 | $CH_2Cl_2$ wash 80 ml (3 times) | 3 |
| 9 | Boc-amino acid (10 mmoles) in 30 ml DMF (1 time) plus dicyclohexylcarbodiimide (DCC) (10 mmoles) in DMF | 30 |
| 10 | McOH wash 40 ml (2 times) | 3 |
| 11 | $Et_3N$ 12.5 percent in DMF 70 ml (1 time) | 3 |
| 12 | McOH wash 30 ml (2 times) | 3 |
| 13 | $CH_2Cl_2$ wash 80 ml (2 times) | 3 |

After step 13, an aliquot is taken for a ninhydrin test: if the test is negative, go back to step 1 for coupling of the next amino acid; if the test is positive or slightly positive, go back to steps 9 through 13.

The above schedule was used for coupling of each of the amino acids of the somatostatin peptide to Cys with the exception of Asn. For Asn, steps 1 through 8 are the same and the following schedule is used for the remainder of the coupling reaction:

Schedule for Boc-Asn-ONp coupling in solid phase synthesis of Somatostatin

| Step | Reagents and operations | Mix times min. |
|---|---|---|
| 9 | DMF wash 60 ml (3 times) | 3 |
| 10 | Boc-Asn-ONp (15 mmoles) in 20 ml DMF (1 time) | 800 |
| 11 | MeOH wash 30 ml (4 times) | 3 |
| 12 | Et₃N 12.5 percent in DMF 30 ml (2 times) | 3 |
| 13 | MeOH wash 30 ml (2 times) | 3 |
| 14 | CH₂Cl₂ wash 80 ml (3 times) | 3 |

After step 14, an aliquot is taken for a ninhydrin test: if the test is negative go back to step 1 for coupling of the next amino acid; if the test is positive or slightly positive, go back to steps 9 through 14.

$N^\alpha$-Boc protection was used for each of the remaining amino acids throughout the synthesis. OBzl was used as a side chain protecting group for Ser and Thr. P-nitrophenyl (ONp) ester was used to activate the carboxyl end of Asn. O-nitrophenyl ester can also be used for this purpose. Benzyloxycarbonyl (Z) or benzyloxycarbonyl-2Cl [Z (2-Cl)] was used as the protecting group for the Lys side chain. The $N^\alpha$ protecting group for the last amino acid applied to the peptide can be any oxycarbonyl, such as Boc or Z. When the R group of the peptide is an organic acid, the organic acid is attached to the peptide before the peptide is cleaved from the resin. The organic acid is attached to the peptide on the resin by introducing the organic acid in the presence of DCC. The organic acid can also be added by using the organic acid as an $N^\alpha$ protecting group for the last amino acid added.

Cleavage of the peptides from the resin and deprotection of the side chain protecting groups of the peptide was performed in hydrofluoric acid in the presence of 100 molar anisole. After elemination of hydrofluoric acid under high vacuum, the peptide was washed with ether and extracted with degassed dilute acetic acid. Lyophilization of the acetic acid extract provided a white fluffy material. This material was subjected to gel filtration in 2N acetic acid in the presence of β-mercaptoethanol.

Active esters can be used in solid phase synthesis and the classical method of synthesis can also be used to prepare the somatostatin peptides of the invention.

An in vitro assay of the effectiveness of somatostatin peptides has been devised. The assay is made by treating pituitary glands removed from rats to separate cells therefrom. The cells are placed in culture dishes in Dulbecco's Modified Eagle Medium (Dulbecco et al., *Virology*, Vol. 8, p. 396, 1949). Carbon dioxide gas and oxygen are supplied to the cell cultures which are maintained at 37°C for 4–5 days prior to use in the assay. Following media changes, cell cultures incubated for a period of 4 hours and particular somatostatin peptides are added thereto. Radioimmunoassay analysis is used to determine the rate of growth hormone secretion which is expressed in nanograms per hour. The results for various somatostatin materials are reported herein below in TABLE 1.

TABLE 1

Effects of ovine hypothalamic extracts and somatostatin peptides on the secretion of growth hormone by rat pituitary cells in monolayer cultures; N. number of cell culture dishes; rGH, rat growth hormone by radioimmunoassay.

| Somatostatin Material | Level of Use | N | rGH (ng/hr) |
|---|---|---|---|
| Control (no somatostatin material) | | 4 | 421.7 ± 49.1 |
| Hypothalamic extract | 0.001 fragment/ml | 3 | 231.0 ± 13.6 |
| Hypothalamic extract | 0.01 fragment/ml | 3 | 118.7 ± 15.8 |
| Hypothalamic extract | 0.1 fragment/ml | 3 | 91.3 ± 9.9 |
| Hypothalamic extract | 0.002 fragment/ml | 5 | 190.7 ± 23.4 |
| Hypothalamic extract | 0.1 fragment/ml | 3 | 120.0 ± 22.7 |
| Hypothalamic extract | 0.5 fragment/ml | 3 | 50.7 ± 16.4 |
| Bridged somatostatin peptide where R is H-Ala-Gly | 0.2nM | 3 | 304.0 ± 45.5 |
| H-Ala-Gly | 1.0nM | 3 | 210.7 ± 17.0 |
| H-Ala-Gly | 5.0nM | 3 | 70.7 ± 16.8 |
| H-Ala-Gly | 25.0nM | 4 | 52.5 ± 2.4 |
| Linear somatostatin peptide where R is H-Ala-Gly | 0.2nM | 3 | 420.0 ± 23.1 |
| H-Ala-Gly | 1.0nM | 4 | 205.0 ± 23.8 |
| H-Ala-Gly | 5.0nM | 3 | 110.0 ± 5.8 |
| H-Ala-Gly | 25.0nM | 3 | 100.0 ± 6.1 |
| H-Ala-Gly | 3.3μM | 3 | 29.3 ± 14.6 |

The hypothalamic extract is obtained by extraction of ovine hypothalamic fragments with a system consisting of chloroform - ethanol - glacial acetic acid - water having a weight ratio of 100:810:5:90. The level of use of hypothalamic extract is based on a unit which corresponds to the somatostatin material which can potentially be extracted from a single hypothalamic fragment.

The results indicate consistent inhibition of the secretion of growth hormone of the pituitary monolayer cultures by the somatostatin materials described in Table 1.

A synthetically produced linear somatostatin peptide was used to test the effectiveness of the peptide in inhibiting the secretion of growth hormone in rats. The somatostatin peptide had the following structure:

H-Ala-Gly-Cys-Lys-Asn-Phe-Phe-Trp-Lys-Thr-Phe-Thr-Ser-Cys-OH

To insure docility and effectiveness of results in the control rats and those injected with the peptide, all of the rats were injected with 0.5 ml of saline solution for three days prior to the tests. Each of the rats were injected by the same person and were handled for a few minutes to effect calming. On the third day 9 rats were injected with 0.5ml. of saline and 36 rats were injected with various levels of the somatostatin peptide. Fifteen minutes after the injection the rats were decapitated and blood samples were taken. The blood samples were assayed for the presence of growth hormone and the results are reported below in TABLE 2.

TABLE 2

| Injection | Number of Rats | GH/ml Serum in Nanograms/ml |
|---|---|---|
| Saline | 9 | 91.6 ± 10.2 |
| 0.4 μg Somatostatin peptide | 9 | 57.9 ± 8.9 |
| 2.0 μg Somatostatin peptide | 9 | 38.6 ± 7.3 |

TABLE 2-Continued

| Injection | Number of Rats | GH/ml Serum in Nanograms/ml |
|---|---|---|
| 10.0 μg Somatostatin peptide | 9 | 15.9 ± 2.9 |
| 50.0 μg Somatostatin peptide | 9 | 12.9 ± 3.6 |

A synthetically produced somatostatin peptide corresponding to the following structure was used to test the effectiveness of the peptide in humans:

H-Ala-Gly-Cys-Lys-Asn-Phe-Phe-Trp-Lys-Thr-Phe-Thr-Ser-Cys-OH

Since the rate of secretion of growth hormone in humans is very low, increase in rate of secretion of growth hormone was first stimulated in each subject. The increased rate of secretion of growth hormone was induced either by oral administration of 0.5 grams of L-Dopa into the subject or by infusing (either directly or indirectly) 0.5 grams of the amino acid, arginine per kg of body weight into the blood stream of the subject over a period of a half hour. Both methods are accepted clinical methods for producing increased secretion of growth hormone in animals. The effect of the administration of L-Dopa or the infusion of arginine on each subject was measured over a period of 3 hours. Thereafter, on a different day, starting at time 0, L-Dopa was administered or arginine was started to be infused into the subject. Also, starting at time 0, 250 micrograms of the somatostatin peptide was injected intravenously into the subject. A further amount of the somatostatin peptide was infused uniformly over a period of 30 minutes or 1 hour to the subject starting at the time 0 in the case of L-Dopa and starting at time 30 minutes in the case of arginine. The rate of growth hormone secretion was again measured over a 3 hour period. The conditions of the test in respect to 9 subjects are set forth below in TABLE 3.

The effect on the rate of secretion of growth hormone in the subject by the growth hormone stimulant is shown in the graphs of FIGS. 1a and 2a for L-Dopa and arginine respectively; this constitutes a control. The inhibiting effect on the rate of growth hormone secretion by the somatostatin peptide is shown in the graphs of FIGS. 1b and 2b for L-Dopa and arginine respectively. The graphs show the mean ± standard error of the various metameters measured: each point corresponds to four (4) human subjects in the case of L-dopa and to four (4) human subjects in the case of arginine.

The clinical significance of somatostatin peptides of the present invention are readily apparent for the treatment of any abnormality involving an increased level of secretion of growth hormone. Particularly, the somatostatin peptides of the present invention are considered to be useful in the treatment of acromegaly and in the management of diabetes; in the latter case this would be implemented either by administration of somatostatin alone or in conjunction with insulin. The somatostatin peptides of the present invention have also been found effective to inhibit the secretion of thyroid stimulating hormone by the pituitary gland and are thus considered to be also of therapeutic value to patients with a disorder or disease involving increased secretion of thyrotropin (also known as thyroid stimulating hormone).

The ability of the somatostatin peptides of the present invention to inhibit TSH secretion are illustrated by the following experiment. It is known that a thyroid stimulating hormone (TSH) can be caused to be released at higher than normal levels by a thyroid stimulating hormone releasing factor (TRF). The structure of TRF is reported in *Nature*, Vol. 226, pp. 321–325, 1970. In a series of experiments, anesthetized rats were injected with various levels of TRF and TRF in combination with a somatostatin peptide of the present invention. The somatostatin peptide had the following structure:

H-Ala-Gly-Cys-Lys-Asn-Phe-Phe-Trp-Lys-Thr-Phe-Thr-Ser-Cys-OH

TABLE 3

| Subject No. | Growth Hormone Stimulant | Level of Use of Growth Hormone Stimulant | Amount of Somatostatin Peptide Injected Intravenously at Time 0 | Amount of Somatostatin Infused |
|---|---|---|---|---|
| 1 | L-Dopa | 0.5 g | 250 μg | 500 μg |
| 2 | Arginine | 0.5 g/kg of body weight | 250 μg | 500 μg |
| 3 | L-Dopa | 0.5 g | 250 μg | 250 μg |
| 4 | Arginine | 0.5 g/kg of body weight | 250 μg | 250 μg |
| 5 | L-Dopa | 0.5 g | 250 μg | 500 μg |
| 6 | L-Dopa | 0.5 g | 250 μg | 500 μg |
| 7 | Arginine | 0.5 g/kg of body weight | 250 μg | 500 μg |
| 8 | Arginine | 0.5 g/kg of body weight | 250 μg | 500 μg |
| 9 | Arginine | 0.5 g/kg of body weight | 250 μg | 500 μg |

Five minutes after the injection a blood sample was taken and the sample was assayed for TSH by a radioimmunoassay method; e.g., see *Endocrinology*, Vol. 91, No. 4, pp. 1045–1053, 1972. The results are reported below in Table 4.

TABLE 4

| Injection | Number of Animals | ng TSH/ml Plasma |
|---|---|---|
| 1 Saline control (.5 ml) | 5 | 0.605 ± 0.055 |
| 2  13.3 ng TRF | 5 | 1.831 ± 0.178 |
| 3   40 ng TRF | 5 | 3.615 ± 0.223 |
| 4  120 ng TRF | 5 | 6.215 ± 0.919 |
| 5  120 ng TRF + 300 ng somatostatin peptide | 5 | 5.168 ± 0.462 |
| 6  120 ng TRF +   1 μg somatostatin peptide | 5 | 4.128 ± 0.741 |
| 7  120 ng TRF +  10 μg somatostatin peptide | 5 | 2.054 ± 0.304 |
| Multiple Range Test of Duncan: 4 vs 5 < .05; 4 vs 6 > .01; 4 vs 7 > .01. | | |

It is anticipated that various modifications may be made in the somatostatin peptides of the present invention. Such modifications in the peptide structure are considered within the spirit and scope of the present invention and the invention is limited only by the appended claims.

What is claimed is:

1. A compound which is capable of inhibiting the secretion of growth hormone in mammalians, said compound being a peptide selected from the group consisting of R-Cys-Lys-Asn-Phe-Phe-Trp-Lys-Thr-Phe-Thr-Ser-Cys-OH, and R-Cys-Lys-Asn-Phe-Phe-Trp-Lys-Thr-Phe-Thr-Ser-Cys-OH, where R is an acylating agent selected from the group consisting of amino acids, dipeptides, tripeptides and aliphatic, aromatic and cyclic organic acids having from 1 to 10 carbon atoms or hydrogen.

2. A compound in accordance with claim 1 wherein R is an amino acid.

3. A compound in accordance with claim 1 wherein R is a dipeptide.

4. A compound in accordance with claim 1 wherein R is a tripeptide.

5. A compound in accordance with claim 1 wherein R is an aliphatic organic acid having from 1 to 10 carbon atoms.

6. A compound in accordance with claim 1 wherein R is an aromatic acid having from 1 to 10 carbon atoms.

7. A compound in accordance with claim 1 wherein R is a cyclic organic acid having from 1 to 10 carbon atoms.

8. A compound in accordance with claim 1 wherein R is selected from the group consisting of Gly, Ala, Ala-Gly, Acetyl-Ala-Gly, Tyr-Gly, Sarc-Gly, Tyr-Ala-Gly, Ala-Tyr-Gly, Acetyl, Acryl, Pivalyl, and Benzoyl.

9. A compound in accordance with claim 8 wherein R is Gly.

10. A compound in accordance with claim 8 wherein R is Ala.

11. A compound in accordance with claim 8 wherein R is Ala-Gly.

12. A compound in accordance with claim 8 wherein R is Acetyl-Ala-Gly.

13. A compound in accordance with claim 8 wherein R is Tyr-Gly.

14. A compound in accordance with claim 8 wherein R is Sarc-Gly.

15. A compound in accordance with claim 8 wherein R is Tyr-Ala-Gly.

16. A compound in accordance with claim 8 wherein R is Ala-Tyr-Gly.

17. A compound in accordance with claim 8 wherein R is Acetyl.

18. A compound in accordance with claim 8 wherein R is Acryl.

19. A compound in accordance with claim 8 wherein R is Pivalyl.

20. A compound in accordance with claim 8 wherein R is Benzoyl.

* * * * *